United States Patent [19]

Sorrells et al.

[11] Patent Number: 5,377,104
[45] Date of Patent: Dec. 27, 1994

[54] PASSIVE SEISMIC IMAGING FOR REAL TIME MANAGEMENT AND VERIFICATION OF HYDRAULIC FRACTURING AND OF GEOLOGIC CONTAINMENT OF HAZARDOUS WASTES INJECTED INTO HYDRAULIC FRACTURES

[75] Inventors: Gordon G. Sorrells, Garland; J. Craig Woerpel, Dallas, both of Tex.

[73] Assignee: Teledyne Industries, Inc., Huntsville, Ala.

[21] Appl. No.: 97,376

[22] Filed: Jul. 23, 1993

[51] Int. Cl.$^5$ .............................................. G01V 1/00
[52] U.S. Cl. ................................................... 364/421
[58] Field of Search ........................ 364/420, 421, 422

[56] References Cited

U.S. PATENT DOCUMENTS

| | | | |
|---|---|---|---|
| 3,739,871 | 6/1973 | Bailey | 181/0.5 NP |
| 4,397,007 | 8/1983 | Goode et al. | 367/68 |
| 4,802,144 | 1/1989 | Holzhausen et al. | 367/35 |
| 5,133,264 | 7/1992 | Cahill | 405/128 |

*Primary Examiner*—Gail O. Hayes
*Assistant Examiner*—Xuong M. Chung-Trans
*Attorney, Agent, or Firm*—Charles C. Garner

[57] ABSTRACT

Using geologic hydraulic fracturing methods and subterranean waste injection and disposal processes well known in the petroleum production industry, hazardous wastes are pulverized, mixed to create a slurry, and injected into a subsurface hydraulic fracture rock formation via a perforated deep well. Injection of the slurry at pressures exceeding the rock's minimum principle stress generates microseismic signals whose sources correspond to the locations and geometry of an expanding hydraulic fracture zone. These signals are detected with seismic sensors. Advanced, Real Time, Passive Seismic Imaging (PSI) methods are applied for automatic data acquisition, compression, analysis and calculation to locate the sources of the signals and to map the dimensions and geometry of the fracture zone in real time. Computer visualization codes are employed to present injection data and the fracture zone location, dimensions and geometry for human interpretation and decisions.

The same real time passive seismic imaging, data acquisition, computer processing and time visualization process is equivalently capable and efficiently applied for interactive management and control of hydraulic fracturization treatment operations for improved production from oil and gas wells in the petroleum industry.

2 Claims, 1 Drawing Sheet

PASSIVE SEISMIC IMAGING FOR REAL TIME MANAGEMENT AND VERIFICATION OF HYDRAULIC FRACTURING AND OF GEOLOGIC CONTAINMENT OF HAZARDOUS WASTES INJECTED INTO HYDRAULIC FRACTURES

TECHNICAL FIELD

Field of the Invention.

This invention is in the field of seismic data from induced hydraulic fractures in the earth, including automatic processing and visualization of said data for management and verification of hydraulic fractures and disposal of hazardous wastes injected into hydraulic fractures.

BACKGROUND OF INVENTION

Background.

Disposal of wastes is one of the largest problems facing the world today. Disposal of hazardous wastes, in particular, is a great problem, because of the necessity to provide safe isolation of the hazards from the environment. A preferable method of hazardous waste disposal is pressure injection into impermeable geologic formations, using hydraulic fracture processes. Waste must be injected below or contained within impermeable layers which contain and seal the hazardous materials from critical zones, reservoirs, aquifers and sources of useful waters.

There is a problem with fracture disposal, however, in knowing where the fractures occur, their growth and propagation in unknown directions, and the possibility that hydraulic fractures and wastes injected into them might migrate in unknown directions and pollute sources of drinking water and other critical geologic zones. For that reason, underground injecting of hazardous wastes without an approved EPA exemption is prohibited. Passive Seismic Imaging (PSI) is an emerging technology which can be used for real time scientific verification of geologic containment of hazardous wastes injected into subterranean hydraulic fractures. Passive Seismic Imaging of hydraulic fractures used for the disposal of hazardous waste as disclosed in this invention will provide real time location, visualization and verification of containment which may meet EPA demonstration requirements for geologic containment of the wastes.

Moreover, in hydraulic fracturing to stimulate production from low permeability oil and gas reservoirs, improved controls are urgently needed. As the interwell spacing in a hydraulically fractured reservoir decreases through further field development, there is an increasing need for precise information concerning the geometry, dimensions, and orientation of the induced fractures, in order to design the well pattern necessary for efficient drainage. Passive Seismic Imaging, including automatic data acquisition, data compression, processing, display and visualization as disclosed herein provides a technology which satisfies this need.

Previous technology. During the 1930's and 40's, it was common in oil and gas exploration to drill into subterranean formations that contained oil and gas but that produced at uneconomically low flow rates. A method for increasing such low flow rates was developed by J. B. Clark in 1948. The method, called "fracturing", was based on the observation that pressure applied at the wellhead to an incompressible fluid would be transmitted downhole to the exposed formation, which would part under the transmitted stress.

U.S. Pat. Nos. 3,108,439 to REYNOLDS et al; 3,262,274 to NELSON, Jr.; 3,292,693 to HILL et al; 3,331,206 to OSBORNE; 3,335,798 to QUERIO et al; 3,374,633 to BRANDT; 3,513,100 to STOGNER; 3,852,967 to STEWART et al; 3,576,513 to LINDERHOFFER et al; 4,787,452 to JENNINGS, JR.; 4,828,030 to JENNINGS, JR.; 4,906,135 to BRASSOW et al; 4,942,929 to MALACHOSKY et al; 5,108,226 to JENNINGS; 5,109,933 to JACKSON; 5,129,469 to JACKSON; 5,133,624 to CAHILL; and 5,191,157 to CROCKER disclose various waste disposal methods involving drilling into suitable subterranean formations and injecting various materials for permanent storage, e.g., radioactive liquids or slurries, waste solids or sludges, or other liquids or gasses, into underground formations. As described in the STOGNER patent for example, a mixture of sharply angular solid waste particles and an aqueous cement are used to fracture and prop open an underground formation. Any incompressible fluid, like cement, can be used as a fracturing inducing fluid, but as described in CAHILL, not all fracture inducing fluids are suitable for permanent waste disposal.

REYNOLDS and NELSON disclose methods of disposing of radioactive wastes. HILL discloses disposal of toxic fluids. BRASSOW, CAHILL and CROCKER disclose disposal of hazardous wastes. Others listed above, using generic terms such as wastes, solid particles, finely ground solids, waste materials, pumpable wastes, and the like, may include hazardous wastes as well. In particular, REYNOLDS, CAHILL and CROCKER disclose disposal into induced hydraulic fractures.

U.S. Pat. No. 3,739,871 to BAILEY teaches the mapping of earth fractures induced by hydrafracturing for gas and oil production; and while BAILEY uses pressure gauges and seismometers in his process, it is not applied to location of hazardous wastes, and is not a real time location and display.

U.S. Pat. No. 4,802,144 to HOLZHAUSEN, ET AL is a method for hydraulic fracture analysis. U.S. Pat. No. 5,010,527 to MAHRER is a method for determining the depth of a hydraulic fracture zone in the earth.

But none teaches a method for real time, automatic calculation, computer imaging, visualization and display of hydraulic fracture location, dimensions and geometry for interactive management of fracturization and for verifying the location and containment of wastes that have been so disposed.

SUMMARY OF THE INVENTION

A subterranean zone is selected which takes advantage of stress barriers, permeability barriers, or distance to separate it from Underground Supplies of Drinking Water.

Using geologic hydraulic fracturing processes well known in the petroleum production industry, hazardous wastes are pulverized, mixed with liquid to create a slurry, and injected into this subsurface rock formation via a perforated deep well. Injection of the slurry at pressures exceeding the rock's minimum principle stress generates microseismic signals whose sources correspond to the locations and geometry of an expanding fracture zone. These signals are detected with seismic sensors within finite range of the zone. Advanced, Real Time, Passive Seismic Imaging (PSI) methods are applied for automatic and simultaneous data acquisition, compression, analysis, processing and calculation to locate the sources of the signals and to map the dimensions and geometry of the fracture zone in real time. Under the demonstrated premise that injected hazardous wastes remain within the hydraulically continuous fracture zone, monitoring of the zone with PSI methods verifies the geologic containment of the wastes and warns of possible loss of containment via migration during injection operations and subsequent shut-in of the well.

The same real time passive seismic imaging and real time visualization process is equivalently capable and efficient for interactive management and control of hydraulic fracturization treatment operations for improved production from oil and gas wells in the petroleum industry.

It is an important objective of this invention to provide for the real time monitoring and verification of the geologic containment of hydraulically induced fractures used for the disposal of hazardous wastes by application of passive seismic imaging methods. The verification will insure, to a high degree of confidence, that there will be no migration of hazardous constituents from the predefined injection zone vertically upward or laterally to underground water supplies, and will provide a warning should such migration occur.

Another goal of the instant invention is to precisely locate microearthquakes in a real time mode and use the seismic data to create a realistic image of a hydraulic fracture during its growth and development stages, depicting its growth in real time within a realistic representation of the local geology, and simultaneously provide the observer with continuously updated data concerning the properties of the disposal operation including pressures, slurry volume, flow rate, viscosity, and the like.

Another important objective of this invention is to provide display of management data for hydraulic fracturing operations, in which real time visualization and display of location and geometry of hydraulic fractures is provided to the control console during the hydraulic injection treatment process. The location, growth, propagation, and velocity of the fracture process are displayed in spatial relationship to other geologic formations, zones, reservoirs, wells, fractures, and sources of potable water, enabling human decisions and management controls to be exercised during the hydraulic injection and treatment process.

Another important objective of this invention is to provide a control system module containing all elements of this process for hands-on management and control of the hydraulic fracturing and injection processes. In conventional practice the fracture geometry is predicted prior to injection. Display of the current fracture geometry will allow the fracture model to be constantly updated so as to provide a more accurate model of future growth.

Practical value of invention. There is an increasing need for real time, precise information concerning the geometry, dimensions, and orientation of induced hydraulic fractures, in order to control and manage the well pattern for efficient production. Passive Seismic Imaging integrated with automatic data acquisition, data compression, processing, display and visualization as disclosed herein provides a technology which satisfies this need.

Underground injecting of hazardous wastes without an approved EPA exemption is prohibited. PSI of hydraulic fractures used for the disposal of hazardous waster may meet EPA demonstration requirements for geologic containment of the wastes while greatly reducing the costs of waste disposal. Further, disposal could generally be accomplished on site without the cost, safety, and political risks associated with transportation of the hazardous wastes. The Federal Register (Oct. 14 1992) reported 1,208 SuperFund Sites for which the EPA estimates the average cost of using existing technologies for clean up at about $25 million per site. By contrast, the cost of disposal of the hazardous wastes from these sites by injection to hydraulic fractures is estimated at about $2–4 million per site. There are an estimated additional 130,000–425,000 hazardous waste sites across the U.S. where projected clean up costs could be reduced from about $300/ton to $50/ton by injecting the wastes in fractures.

BRIEF DESCRIPTION OF THE DRAWINGS

The features and advantages of the present invention will be understood by reading the following description in conjunction with the drawings, in which.

DESCRIPTION OF INVENTION

Figure 1:
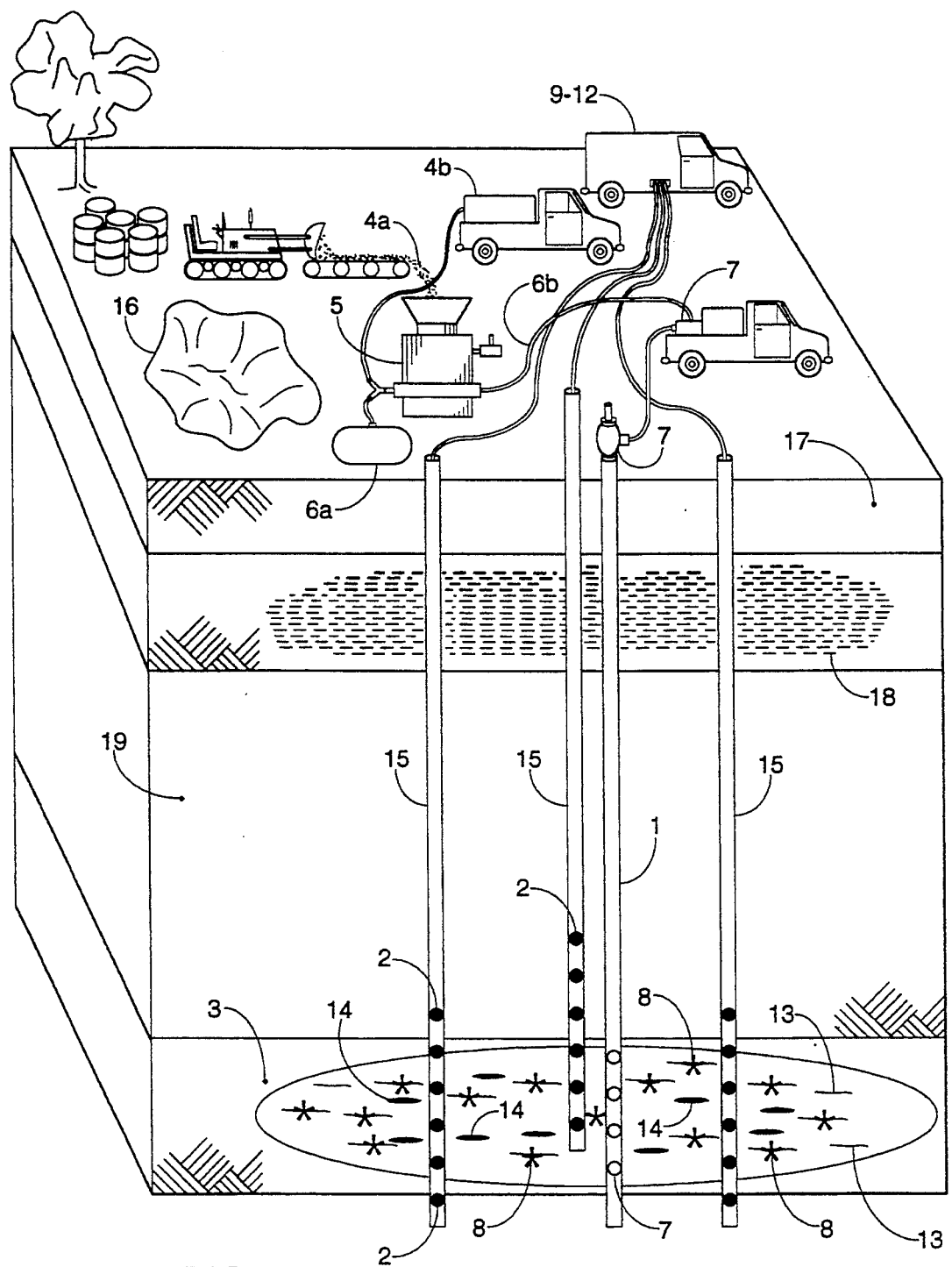
FIG. 1 is a schematic illustration of seismic verification of waste disposal containment, comprising the process and device as described under Description of Invention, showing the injection well 1, seismometers 2, injection zone 3, contaminated soil 4, contaminated ground water 5, pulverizer 5, solidifier 6, fracture injection 7, seismic sources 8, automatic process monitoring 9–12, hydraulic fracture 13, waste filled fracture 14, and monitor wells 15.

The following is a list of the steps comprised in the preferred embodiment of this invention:

Step 1. Using processes well known in the petroleum production business, a suitable site is selected, a deep well 1 is drilled, cased and completed at the hazardous waste site. The well must have surface casing designed to protect local aquifers. The well casing is perforated with an explosive device at a depth safely below the deepest underground supply of drinking water (USDW). The injection zone will be selected to take advantage of any stress barriers, permeability barriers, or distance to separate it from Under Ground Supplies of Drinking Water. The rock layer separating the perforated injection zone and the deepest USDW is called the confining zone.

Step 2. An array of seismic sensors 2, such as seismometers, geophones and hydrophones, connected by cable-equivalent means, is installed to provide the maximum practical coverage of the injection and confining zones 3. Current practice, for example, uses three monitor wells 1A drilled to the bottom of the injection zone 3 with at least five three-component geophones 2 installed in each well. The geophone array 2 is connected to a computer-based, automatic seismic data processing system 9–12 which may be installed in a van or trailer for transportability.

Step 3. Seismic velocities in the various strata in and above the injection zone 1B are determined. Sonic logs define the depth of the strata and approximate velocities. To further resolve velocities, the perforation signals or other calibration shots are recorded on tape by the data processing system 9–12. Using a range of possible velocities, hypocenter locations are calculated by the hypocenter routine discussed in Step 10. The velocity model which gives hypocenters which are closest to the known shot locations is selected as the best model.

Step 4. Using processes well known to persons of ordinary skill in hazardous waste disposition, simple and conventional preprocessing techniques are applied to each of the following categories of hazardous waste:
  a. Contaminated soil 4 is excavated with heavy equipment such as bulldozers and can be moved by conveyor belt.
  b. Contaminated ground water 5 is extracted with pumps through shallow wells.
  c. Solid state hazardous wastes are crushed or pulverized 5A as necessary to sand-sized particles.
  d. Liquid state hazardous wastes require no preprocessing.

Step 5. Existing oil field hydraulic fracture technology and equipment are used for steps 5, 6, and 7. While some of the equipment may require modification to handle hazardous wastes, the basic techniques are well-established. A liquid transport agent is added to the preprocessed waste to create a slurry. The "slurry" may, in fact, be a liquid. In many cases, the transport agent will be the contaminated ground water extracted from shallow wells.

Step 6. A solidification agent 6, which can be either thermally or mechanically activated, may be added to the slurry at this stage.

Step 7. High pressure pumps are used to cause controlled fracturization 7, and to inject the slurry through hoses and pipes into the deep well and through the perforations into the surrounding rock formation. Injection at pressures greater than the minimum principle stress of the formation will create a hydraulic fracture 7A in the rock which will grow and propagate as additional slurry is injected. Down-hole pressure and flow rates are monitored and controlled to ensure efficient and complete disposal of the required volume of hazardous waste. In conventional practice the fracture geometry is predicted prior to injection. Display of the current fracture geometry will allow the fracture model to be constantly updated so as to provide a more accurate model of future growth.

Step 8. An expanding hydraulic fracture invariably generates microearthquake signals from sources 8 which are within, or acceptably close to, the hydraulic fracture zone. These signals radiate through the rock to the seismic sensor array 2. They are converted by the geophones to analog electrical signals which are then transmitted to the automatic processing computers 9–12. The analog signal is amplified and digitized. Each geophone thus produces a separate channel of data.

Step 9. The resulting digital data are processed by a real time signal detection algorithm. Whenever the signal energy level of a channel exceeds the background noise level by some preset ratio (typically 3 to 5), a signal is declared and its arrival time and amplitude are recorded. An association algorithm uses known station locations and seismic velocities to determine which arrival times are associated, that is, which are from the same microearthquake. Associated signals are also sorted by their phase, which may be either primary waves (P) or secondary waves (S).

Step 10. The P and S wave arrival times from Step 9 and the best velocity model from Step 3 are then input to a hypocenter location program. The hypocenter is the point where the rock first ruptured to begin the microearthquake. First, a reasonable trial hypocenter and origin time are selected. Predicted arrival times at each station are calculated and compared to observed arrival times. The errors are used to calculate corrections to the x, y, and z coordinates of the hypocenter and to the origin time. After corrections are applied, new arrival times are calculated and the process is repeated through several iterations until the standard deviation of the residual errors falls below a preset acceptable level. The resulting hypocenter and origin time are output to an event list. This list is updated with new microearthquakes as they occur, i.e., in real time.

Step 11. Moment tensors are automatically calculated from the signal amplitudes for each event. They are used to determine if the event has a tensional source, indicating it is actually part of the hydraulic fracture, or a shear source, which would be adjacent to but not in the hydraulic fracture, and thus containing no waste slurry. Moment tensors also provide the orientation of the microfracture plane associated with each event. Calculation of displacement spectra is another well known seismic processing technique for obtaining source dimensions. Displacement spectra will be calculated, corner frequencies measured, and source dimension estimated for each event.

Step 12. Finally, a three dimensional display map of the hypocenters is projected on a large screen television for viewing by environmental officials and hydraulic fracture technicians. The display can be rotated on the screen to show a map view or any desired cross section. Tensional and shear events will be depicted with different colors or symbols. The areal extent of these sources is an excellent demonstration of the extent of the waste filled fractures. This map will provide verification that the fracture is contained in the injection zone. Any migration of seismic activity into the confining zone will be immediately evident. In this case, injection flow rates and pressures can be modified or shut down long before any USDW, or other critical zone, is threatened.

Step 13. Cessation of slurry injection causes bottom hole pressure to drop below the minimum principle stress of the formation. Therefore all fractures will close, permanently trapping the hazardous waste slurry in the zone mapped by seismic hypocenters.

Step 14. Activation of the solidification agent, where appropriate, would provide additional assurance of waste immobilization and containment, if deemed necessary.

SEISMIC VERIFICATION TECHNOLOGY OF INVENTION

The Seismic Verification technology of this invention is a process and system for real time calculation, imaging, visualization and display of location, dimensions and geometry of hydraulic fractures, geologic zones, and critical characteristics. Real time imaging is used for interactive process management, direction and control of hydraulic fracture treatment of oil and gas wells for the petroleum industry, and for management of injection and embedment of hazardous wastes into subterranean hydraulic fractures, including verification of containment.

The Seismic Verification portion of this invention comprises integration of the following tasks:
 1. High Resolution Sensors and Sensor Network Deployment.
 2. Seismic Velocity Distribution Model Calibration.
 3. Real Time Seismic Data Automatic Acquisition.
 4. Real Time Data Compression.

5. Real Time Seismic Phase Identification and Arrival Time Estimation.
6. Real Time Seismic Source Location.
7. Real Time Moment Tensor Analysis.
8. Real Time Determination of Hydraulic Fracture Dimensions and Geometry.
9. Real Time Hydraulic Fracture Visualization.
10. Seismic Verification System Module.

Tasks comprising seismic verification portion of this invention, are described as follows:

1. High Resolution Sensors and Sensor Network Deployment.

An array of seismic sensors, or geophones, connected by cable-equivalent means, is installed to provide the maximum practical seismic coverage of the injection and confining zones. Current practice uses three monitor wells drilled to the bottom of the injection zone with at least five three-component geophones installed in each well. For increased cost efficiency, a near surface array of high sensitivity, high resolution sensors may be equivalent. In a near surface array, three-component geophones, and equivalently, three-component hydrophones, are installed in relatively shallow boreholes, near the surface, drilled to just beneath the weathered layer. The geophone array is connected to a computer-based, automatic seismic data processing system which is installed in a van or trailer.

2. Seismic Data Acquisition.

For Real Time data acquisition, the system will simultaneously record data from about 50 sensors, well distributed about the hypocenter; at a rate greater than or equal to 2,000 samples per second (SPS), per sensor. The seismic data must be processed continuously during the stimulation, in order to insure that no locatable signals go undetected. Operations can continue at a given site for several months.

3. Real Time Data Compression.

A data acquisition system for this disclosed seismic verification invention must be con figured to process continuously approximately 50 channels or more of data at a 2,000 SPS rate, per sensor, and detect, then flag the arrival times of seismic signals. Since these high data rates would fill existing storage media at an unacceptable rate, data compression is required. A system of that configuration will detect and accurately tag approximately 90% of the microearthquake events that would be picked up by an experienced observer, while operating with a negligible false alarm rate. Only the signal segments are retained for further processing and are transmitted to a data processing work station in real time.

4. Real Time Seismic Phase Identification and Arrival Time Estimation.

Technology exists to perform seismic signal phase identification and arrival time estimation in a Real Time environment. One such system developed by the Defense Advanced Research Projects Agency DARPA Nuclear Monitoring Research Office (NMRO), is designed to verify compliance with underground nuclear test ban treaties. Another system is used by USGS and the University of Washington to monitor volcanoes. The system of this invention will be based on the USGS algorithm, being less sophisticated than the DARPA system, picking only P and S arrivals.

5. Seismic Source Location.

Accurate seismic source locations require: positive identification of elastic wave phase types and precise measurements of their arrival times at the various observation points in the network; a well calibrated model of their velocity distributions; and precise measurements of the coordinates of the observation points. The coordinates of the observation points can be physically measured, and equivalently may be estimated with acceptable precision prior to the beginning of the hydrafracture and waste disposal operations by attaching a radioactive tag to each geophone before installation. A radioactive log after installation pinpoints the geophone depth. A first order velocity model can be derived from long spaced sonic log data acquired in the prospective injection well and in the nearby observation wells. Regardless of the quality of the long spaced sonic log data, calibration of the model is usually required to produce seismic source location estimates with acceptable errors. Model calibration is done by measuring the travel times of the elastic waves triggered by the perforation shots to the observation points, then making a static correction to the observed seismic event arrival times to account for model bias.

The use of manual, off-line interactive methods for identification of phase types and for estimation of their arrival times, adds recurring labor costs to the overall price of applying PSI technology and would preclude real time utilization of the processed passive seismic imaging results. Therefore, automatic machine methods must be used in this invention for Real Time identification of phase types and for the measurement of their arrival times, applicable in a real time environment. Such methods have been developed and are well known for other seismic monitoring purposes (as discussed in section 4, above), and will be adapted for use in PSI fracture surveys. This is essential, since real time imaging of induced fracture growth will have a favorable impact by minimizing recurrent data processing costs and by providing the capability for interactive process management and control.

6. Hydraulic Fracture Dimensions and Geometry.

Moment tensors are automatically calculated from the signal amplitudes for each event. They are used to determine if the event has a tensional source, indicating it is actually part of the hydraulically continuous fracture, or a shear source, which would be adjacent to the hydraulic fracture but containing no waste slurry. Moment tensors also provide the orientation of the microfracture plane associated with each event. Plotting of these microfractures will provide additional useful information to the fracture technicians and will better resolve the total fracture zone.

Hydraulic stimulation of a well often creates not just a single planar fracture, but rather, a complex network of interconnected tensional and shear fractures. The seismic source distribution accurately defines the volume of rock containing the induced fracture network. Therefore, the seismic activity generated by a hydraulic fracturing treatment must reflect the activation of both tensional and shear sources.

Existing PSI technology, which focuses only on the precise location of the treatment induced seismic sources, does not discriminate between seismic sources based upon their source mechanisms. The capability to reliably make this distinction will provide the direct link between the complex fracture zone and the included tensional seismic source distribution necessary for the accurate estimation of hydraulic fracture dimensions and geometry. This capability develops the image of the hydraulic fracture by using only the tensional source locations. This provides a map of the induced fracture(s) with a resolution subject only to the uncertainty in source locations, which should be small in comparison to the dimensions of the fracture(s).

The capability to discriminate between seismic sources on the basis of their failure mechanisms has been used by the earthquake seismological community for some time. A simplified moment tensor analysis method used on data acquired during a small scale fracturing experiment can be used for real time PSI survey applications. Calculation of displacement spectra is another well known seismic processing technique for obtaining source dimensions. Displacement spectra will be calculated, corner frequencies measured, and source dimension estimated for each event.

7. Hydraulic Fracture Visualization.

A major goal of the instant invention is not only to precisely locate microearthquakes in a real time mode, but to use the seismic data to create a realistic image of a hydraulic fracture during its growth and development stages. The technology to create such an image in real time exists today at an acceptable cost, and is well known to persons of ordinary skill in the art. The ideal visualization of the hazardous waste disposal fracture must accurately depict its growth in real time within a realistic representation of the local geology and simultaneously provide the observer with continuously updated data concerning the properties of the disposal operation; i.e. slurry volume, rate, viscosity, etc. Computer visualization codes exist and are well known in the industry which will provide visualization of the growth and development of hydraulic fractures, and have been used to build an animation which visually depicts the growth and development of the fractures induced in a well operated by Shell Western Exploration and Production, Inc. in the South Belridge field in Kern Co. California. This family of codes is used in this invention to display the output of codes identified in previous sections of this document on a 3 dimensional map which can be rotated to a map view or any desired cross-section. Outputs to be displayed are: (1) local geology including aquifers; (2) predicted fracture growth history; (3) disposal parameters; and (4) actual fracture growth history.

8. Seismic Verification System Module.

Technological advances described in previous paragraphs will provide the minimum technology for real time seismic management of hydraulic fracturization processes and for seismic verification of fracture containment of hazardous wastes injected into subterranean hydraulic fractures. This capability is integrated into a modularized system for use as the tool for process management and control for hydraulic fracture treatment process by the petroleum industry and for applications at Department of Defense and private industry hazardous waste sites. At a minimum, the data acquisition, processing and visualization components of the system will be integrated on a ruggedized work station platform and installed in a van or trailer for easy transportation and from the work site. The system should be supported by the self-contained capability to rapidly deploy and to recover a network of sensors to supply the data necessary for seismic verification. Finally the system should be supported by the self-contained capability to estimate the seismic velocity distribution characterizing the disposal zone and the surrounding rock formations.

PREMISES AND DEFINITIONS

Premises. Geological tests have demonstrated validity of the following premises and conclusions:

I. Hydraulic pressures exceeding rock's minimum principal stress induce hydraulic fracture zones.

II. Hydraulic fracture inducement generates microseismic signals.

III. Locations of sources of said signals correspond to location and geometry of expanding hydraulic fracture zones and migration.

IV. A hydraulic fracture is hydraulically continuous.

V. A "fracture" or "fracture zone" may contain shear fractures which are hydraulically disconnected from the hydraulic fracture.

VI. Hazardous wastes injected into hydraulic fractures will remain within the limits of expanding hydraulic fracture zones.

VII. A Map of expanding hydraulic fracture zones provides a map for interactive management and control of hydraulic fracturization processes.

VIII. A Map of expanding hydraulic fracture zones and migration provides a map of hazardous waste locations, dimensions, geometry, and containment.

IX. Real Time display visualization of fracture zones, locations, dimensions and geometry provides means for interactive process management and control of the ongoing hydraulic fracture treatment and hazardous waste injection process, as well as verification of containment.

Definitions

1. In this disclosure, the terms "waste" and "hazardous wastes" will be understood to include hazardous waste as defined in the United States Resource Conservation and Recovery Act (RCRA) of 1976, as amended, and regulations thereunder, as well as toxic wastes, and radioactive wastes, and by equivalency will be appropriately applicable to industrial wastes and other wastes in general.

2. The term "passive seismic imaging" (PSI) means the science of applied seismology to passively sense, detect and visualize the results of microseismic signals from hydraulically induced fractures and injections in the earth. The term "passive" means the signals are passively monitored and not generated by the sensing device, but are emitted by the fracture event itself. The signals are generated by the physical changes in the local effective stress state which are in fact the fracture—a rupture and crack—the result of a combination of primarily tensional, and to some degree shear, forces, which exceeds the stress capacity of the geologic structure, causing it to snap apart, thus causing physical activity which emits a signal.

3. In this disclosure, passive seismic imaging (PSI) is expanded and enhanced to sense and detect the passive seismic microsignals, identify, record, compress and process with algorithms, data from the microsignals, compare that data with models of the surrounding environment, calculate the locations of those sources, define the dimensions and geometry of the fracture zones of those sources, i.e. to locate and define the geometry of the sources, and to resolve, display and visualize those data. In this invention, PSI is used to calculate and display those locations on monitors, in coordination with the calculated model characteristics and locations of other critical parts of the formation, including other reservoirs, formations, fractures, potable water, and other critical areas of management and safety interest.

4. In this invention, PSI, seismology, computer processing and display are used to provide "real time" visualization of the essential and critical management details for human decision making and on-going, hands on control of the fracture, and where applicable the waste injection process, for driving the operation.

5. "Real time," as used in this disclosure to describe calculations, display, visualization, verification and other functions herein, means the results are so quickly calculated and displayed for visualization as to be almost coincident with the measured events—not literally simultaneously, but so near in time, as to be for practical purposes instantaneous results, as opposed to survey data which is gathered and calculated at some time later for after—the—fact evaluation.

6. The acronym "USDW" will be understood to mean underground supply of drinking water (USDW).

7. The term "moment tensor analysis" will be understood to mean the capability and method to discriminate between seismic sources on the basis of their tension and shear failure mechanisms as used by the earthquake seismological community for some time.

We claim:

1. A process for real time management and verification of geologic containment of hazardous wastes injected into subterranean hydraulic fractures, comprising the steps of:
   a. Arranging and installing an array of high sensitivity, high resolution seismic sensors about a selected subterranean injection zone and disposal well for injection disposal of hazardous wastes; wherein said sensors are installed in boreholes, drilled to a selected depth; wherein said sensors provide known observation points for maximum practical coverage of said injection zone; wherein said sensors comprise means for detecting and receiving passive seismic signals from microearthquake events in said expected injection zone as described in step g. below; and making precise measurement of location coordinates of said sensor observation points;
   b. Connecting said sensors to a computer-based, real time, automatic seismic data processing system:
      1. wherein said computer-based system comprises means for automatic processing of passive seismic signal data, on real time basis, continuously during and throughout planned fracture processing at a given site for periods which may last as long as several months; and
      2. wherein said computer-based system further comprises means for real time compression of passive seismic signal data, simultaneously receiving, recognizing, recording and processing continuously, signal data from as many as 50 channels or more of data at rates of 2,000 signals per second, per sensor, or greater, and for detecting, flagging, and recording precise measurements of arrival times of both primary and secondary wave phases of passive seismic signals on a real time basis as received, with only signal segments retained for further processing;
   c. Determining precise velocities of seismic signals traveling through underground strata in and above said injection zone, wherein said determination comprises measuring origin times and arrival times of signals generated by perforation of said well by means well known in the art, as said signals travel from known location of said perforation to said known sensor observation points;
   d. Calibrating a best seismic velocity distribution model of said strata, wherein said calibration comprises the steps of:
      (1) making static corrections to observed seismic event arrival times to account for model bias;
      (2) calculating theoretical hypocenter locations using hypocenter location routine from step 1. below, and a range of hypothetical velocities;
      (3) comparing said theoretical locations with known locations of said perforation shots; and
      (4) selecting best velocity distribution model which gives calculated locations which are closest to known shot locations;
   e. Pumping and injecting a slurry suitable for hydraulic fracturing and injection, comprising said hazardous wastes mixed with a selected liquid transport agent, wherein said slurry is injected through said perforation at pressures exceeding minimum principle stress of formations of said injection zone to cause controlled fracturization wherein hydraulic fractures are created in said formation which grow and propagate as additional slurry is injected; and continuing to inject said slurry into fractures as generated in surrounding rock formation at controlled rates while monitoring and controlling down-hole pressure and flow rates to ensure efficient and complete disposal of required volume of said hazardous wastes;
   f. Wherein said injecting and fracturization causes changes in local geologic effective stresses which trigger microearthquakes; wherein said microearthquakes at the instant of fracture trigger weak passive seismic signals from the source of each said microearthquake event; wherein said passive seismic signals travel through said formations to said array of sensors; and wherein the sources of said signals are known to be located within and acceptably close to said induced hydraulic fractures clustering in narrow ellipsoidal volume of rock which enclose said induced fracture or network of fractures;
   g. Receiving said passive seismic signals, at each said sensor; converting them to analog electrical signals; and transmitting them as received to said processing system;
   h. Amplifying and digitizing said analog signals, wherein a separate channel of data is produced from each sensor;
   i. Automatically detecting, measuring, and recording said digital data using real time signal detection algorithm:
      1. wherein, whenever the signal energy level of a channel exceeds the background noise level by a preset ratio, a signal is recognized and declared; and
      2. wherein arrival time and amplitude of said signal are measured and recorded;
   j. Determining and recording, on real time basis, which signals and arrival times are associated from the same microearthquake event, based on said known station locations and velocities in an association algorithm;

k. Sorting and identifying said associated signals for real time, positive identification and recording of their phase types, which may be either primary waves or secondary waves; and recording precise arrival times of said primary and secondary waves at each of said sensors;

l. Determining hypocenter location and origin time for signals from each said microearthquake event in real time as said events occur, based on existing known earthquake hypocenter location program and hypocenter location data;

m. Recording resulting hypocenter location and origin time for each said microevent to an event list in real time, wherein said list is continually updated with new location and origin time of each said microearthquake as said events occur;

n. Automatically calculating moment tensor source mechanisms for each event, by means comprising said signal amplitudes for each said event; determining if said event has a tensional source, which indicates it is part of the hydraulic fracture, or a shear source, which indicates it is adjacent to but not in the hydraulic fracture and thus contains no waste slurry; and recording each said tension source by type and location;

o. Determining orientation azimuth of the microfracture plane associated with each said event based on said moment tensors;

p. Creating and displaying an animated visualization image, using means comprising computer codes and said real time event locations, source mechanisms and orientations, wherein said visualization image comprises:
  1. displaying a rotatable, animated, three dimensional, real time, visualization of said hypocenter event distributions, wherein a distinction is made between hypocenter locations based on said source mechanisms; wherein said animated visualization is provided with high resolution subject only to small and acceptable deviation of said source locations;
  2. animating said visualization in real time;
  3. accurately imaging and visually displaying development, growth, propagation, direction and velocity of induced fractures in real time as said injection process continues;
  4. displaying said animated map visualization on large screen television for viewing by environmental officials and hydraulic fracture technicians;
  5. rotating said three dimensional display on said screen as desired to show any desired cross section and map view;
  6. displaying predicted fracture geometry and comparing it with current actual geometry as displayed in real time during said injection process; wherein said predicted fracture geometry is constantly updated on a real time basis to provide continuing updated prediction and model of future growth; and
  7. visualizing said fracture growth in real time displayed within a realistic, real time animated image of the local geology, in spatial relationship to other geologic formations, zones, reservoirs, wells, fractures and sources of potable water, and simultaneously providing the observer with continuously updated visual image and display of data concerning the properties of the disposal operation including pressure, slurry volume, flow rate, viscosity, and the like, as injection continues;

q. Depicting and displaying said tensional and shear events with different colors or symbols in said animated map visualizations:
  1. wherein the areal extent of said displayed sources provides real time demonstration of the location and extent of waste filled fractures;
  2. wherein said animated map provides real time verification that said fracture is contained in said selected injection zone; and
  3. wherein the direction and velocity of any migration of seismic activity toward said sensitive zones is immediately evident, permitting management decisions and actions such as shut down or modification of injection flow rates and pressures to be accomplished long before said sensitive zones are threatened.

2. A work station device for real time passive seismic imaging and management of disposal of hazardous wastes by injection into subterranean hydraulic fractures with verification of geologic containment, comprising:

a. Means for arranging and installing an array of high sensitivity, high resolution seismic sensors about a selected subterranean injection zone and disposal well for injection disposal of hazardous wastes; wherein said sensors are installed in boreholes, drilled to a selected depth; wherein said sensors provide known observation points for maximum practical coverage of said injection zone; wherein said sensors comprise means for detecting and receiving passive seismic signals from microearthquake events in said expected injection zone as described in step g. below; and making precise measurement of location coordinates of said sensor observation points;

b. Means for connecting said sensors to a computer-based, real time, automatic seismic data processing system:
  1. wherein said computer-based system comprises means for automatic processing of passive seismic signal data, on real time basis, continuously during and throughout planned fracture processing at a given site for periods which may last as long as several months; and
  2. wherein said computer-based system further comprises means for real time compression of passive seismic signal data, simultaneously receiving, recognizing, recording and processing continuously, signal data from as many as 50 channels or more of data at rates of 2,000 signals per second, per sensor, or greater, and for detecting, flagging, and recording precise measurements of arrival times of both primary and secondary wave phases of passive seismic signals on a real time basis as received, with only signal segments retained for further processing;

c. Means for determining precise velocities of seismic signals traveling through underground strata in and above said injection zone, wherein said determination comprises measuring origin times and arrival times of signals generated by perforation of said well by means well known in the art, as said signals travel from known location of said perforation to said known sensor observation points;

d. Means for calibrating a best seismic velocity distribution model of said strata, wherein said calibration comprises the steps of:
   (1) making static corrections to observed seismic event arrival times to account for model bias;
   (2) calculating theoretical hypocenter locations using hypocenter location routine from step 1. below, and a range of hypothetical velocities;
   (3) comparing said theoretical locations with known locations of said perforation shots; and
   (4) selecting best velocity distribution model which gives calculated locations which are closest to known shot locations;

e. Means for pumping and injecting a slurry suitable for hydraulic fracturing and injection, comprising said hazardous wastes mixed with a selected liquid transport agent, wherein said slurry is injected through said perforation at pressures exceeding minimum principle stress of formations of said injection zone to cause controlled fracturization wherein hydraulic fractures are created in said formation which grow and propagate as additional slurry is injected; and continuing to inject said slurry into fractures as generated in surrounding rock formation at controlled rates while monitoring and controlling down-hole pressure and flow rates to ensure efficient and complete disposal of required volume of said hazardous wastes;

f. Wherein said injecting and fracturization causes changes in local geologic effective stresses which trigger microearthquakes; wherein said microearthquakes at the instant of fracture trigger weak passive seismic signals from the source of each said microearthquake event; wherein said passive seismic signals travel through said formations to said array of sensors; and wherein the sources of said signals are known to be located within and acceptably close to said induced hydraulic fractures clustering in narrow ellipsoidal volume of rock which enclose said induced fracture or network of fractures;

g. Means for receiving said passive seismic signals, at each said sensor; converting them to analog electrical signals; and transmitting them as received to said processing system;

h. Means for amplifying and digitizing said analog signals, wherein a separate channel of data is produced from each sensor;

i. Means for automatically detecting, measuring, and recording said digital data using real time signal detection algorithm:
   1. wherein, whenever the signal energy level of a channel exceeds the background noise level by a preset ratio, a signal is recognized and declared; and
   2. wherein arrival time and amplitude of said signal are measured and recorded;

j. Means for determining and recording, on real time basis, which signals and arrival times are associated from the same microearthquake event, based on said known station locations and velocities in an association algorithm;

k. Means for sorting and identifying said associated signals for real time, positive identification and recording of their phase types, which may be either primary waves or secondary waves; and recording precise arrival times of said primary and secondary waves at each of said sensors;

l. Means for determining hypocenter location and origin time for signals from each said microearthquake event in real time as said events occur, based on existing known earthquake hypocenter location program and hypocenter location data;

m. Means for recording said resulting hypocenter location and origin time for each said microevent to an event list in real time, wherein said list is continually updated with new location and origin time of each said microearthquake as said events occur;

n. Means for automatically calculating moment tensor source mechanisms for each event, based on said signal amplitudes for each said event; determining if said event has a tensional source, which indicates it is part of the hydraulic fracture, or a shear source, which indicates it is adjacent to but not in the hydraulic fracture and thus contains no waste slurry; and recording each said tension source by type and location;

o. Means for determining orientation azimuth of the microfracture plane associated with each said event based on said moment tensors;

p. Means for creating and displaying an animated visualization image, using computer codes and said real time event locations, source mechanisms and orientations, wherein said visualization image comprises:
   1. displaying a rotatable, animated, three dimensional, real time, visualization of said hypocenter event distributions, wherein a distinction is made between hypocenter locations based on said source mechanisms; wherein said animated visualization is provided with high resolution subject only to small and acceptable deviation of said source locations;
   2. animating said visualization in real time;
   3. accurately imaging and visually displaying development, growth, propagation, direction and velocity of induced fractures in real time as said injection process continues;
   4. displaying said animated map visualization on large screen television for viewing by environmental officials and hydraulic fracture technicians;
   5. rotating said three dimensional display on said screen as desired to show any desired cross section and map view;
   6. displaying predicted fracture geometry and comparing it with current actual geometry as displayed in real time during said injection process; wherein said predicted fracture geometry is constantly updated on a real time basis to provide continuing updated prediction and model of future growth; and
   7. visualizing said fracture growth in real time displayed within a realistic, real time animated image of the local geology, in spatial relationship to other geologic formations, zones, reservoirs, wells, fractures and sources of potable water, and simultaneously providing the observer with continuously updated visual image and display of data concerning the properties of the disposal operation including pressure, slurry volume, flow rate, viscosity, and the like, as injection continues;

q. Means for depicting and displaying said tensional and shear events with different colors or symbols in said animated map visualizations:
   1. wherein the areal extent of said displayed sources provides real time demonstration of the location and extent of waste filled fractures;
   2. wherein said animated map provides real time verification that said fracture is contained in said selected injection zone; and
   3. wherein the direction and velocity of any migration of seismic activity toward said sensitive zones is immediately evident, permitting management decisions and actions such as shut down or modification of injection flow rates and pressures to be accomplished long before said sensitive zones are threatened; and r. Means for integrating said data installing, receiving, acquisition, compression, processing, calculating, determining and visualization means into a modularized work station system for in-process management and control of hydraulic fracture treatments and for verification of geologic containment of hazardous wastes injected in hydraulic fractures.

* * * * *